United States Patent
Lavene et al.

(10) Patent No.: US 8,675,336 B2
(45) Date of Patent: Mar. 18, 2014

(54) MULTIPLE CONCENTRIC WOUND FILM CAPACITORS

(75) Inventors: Bernard Lavene, Ocean, NJ (US); David Curto, Toms River, NJ (US)

(73) Assignee: Electronics Concepts, Inc., Eatontown, NJ (US)

( * ) Notice: Subject to any disclaimer, the term of this patent is extended or adjusted under 35 U.S.C. 154(b) by 179 days.

(21) Appl. No.: 13/362,799

(22) Filed: Jan. 31, 2012

(65) Prior Publication Data

US 2013/0194712 A1 Aug. 1, 2013

(51) Int. Cl.
*H01G 2/14* (2006.01)

(52) U.S. Cl.
USPC ............. 361/274.1; 361/302; 361/274.2; 361/301.3; 361/305; 361/536

(58) Field of Classification Search
USPC ........ 361/302, 303, 305, 274.1, 274.2, 301.3, 361/301.5, 536, 537
See application file for complete search history.

(56) References Cited

U.S. PATENT DOCUMENTS

| | | | | |
|---|---|---|---|---|
| 4,264,943 | A | * | 4/1981 | Anderson et al. ............. 361/511 |
| 4,620,166 | A | * | 10/1986 | De Faveri et al. ............. 333/184 |
| 4,685,026 | A | | 8/1987 | Lavene |
| 4,719,539 | A | | 1/1988 | Lavene |
| 4,802,063 | A | * | 1/1989 | Carino .......................... 361/513 |
| 5,034,849 | A | * | 7/1991 | Vetter ........................... 361/302 |
| 5,614,111 | A | | 3/1997 | Lavene |
| 6,946,007 | B2 | * | 9/2005 | Bendale et al. .............. 29/25.03 |
| 7,365,962 | B2 | * | 4/2008 | Miura et al. .................. 361/537 |
| 7,471,498 | B2 | | 12/2008 | Lavene et al. |
| 7,471,499 | B2 | * | 12/2008 | Bond .......................... 361/274.1 |

* cited by examiner

*Primary Examiner* — Nguyen T Ha
(74) *Attorney, Agent, or Firm* — Ratnerprestia

(57) ABSTRACT

Multiple wound film capacitors include a hollow core formed by a first non-conducting tubular section, and a first capacitor winding wrapped around the first non-conducting tubular section. Also included are a second non-conducting tubular section wrapped around the first capacitor winding, and a second capacitor winding wrapped around the second non-conducting tubular section. The multiple wound film capacitors may also include a third non-conducting tubular section wrapped around the second capacitor winding, and a third capacitor winding wrapped around the third non-conducting tubular section. In addition, ends of the first and second non-conducting tubular sections extend beyond ends of the first and second capacitor windings.

10 Claims, 5 Drawing Sheets

MULTIPLE CONCENTRIC WOUND FILM CAPACITORS

FIELD OF THE INVENTION

The present invention relates, in general, to wound metallized film capacitors. More specifically, the present invention relates to multiple concentric film capacitors that are wound one on top of another, using a previous capacitor as a new winding core.

BACKGROUND OF THE INVENTION

Industry standards for AC and high power DC capacitors have traditionally centered around oil filled capacitor technology. This technology offers benefits of high corona resistance and transient capabilities. Capacitors using this type of technology, however, have problems of potential oil rupture, expensive housings and terminals, poor high frequency response (noisy), mounting restrictions and increased weight. Oil fill technology traditionally employs series disconnects which remove the capacitor from the circuit (or system) by physical distortion of the capacitor housing to break the conductor. These capacitors are permanently disconnected from the circuit and cannot be reset.

Dry film technology offers advantages over oil fill technology. These advantages include broad frequency range, low power loss, light weight, and self healing devices without liquid rupture potential or mounting restrictions. Dry film capacitors, however, have a failure mode that is typically not found in oil fill capacitors. This failure mode is caused by the quality of the capacitor and its electrode configuration which does not allow the capacitor to go to a low resistance short. Instead, the capacitor continually self heals, as the operating temperature inside the capacitor is increased above its operational limits. As the healing continues, the capacitor continues to function and becomes hotter. This, in turn, causes further healing and leads to an avalanching affect. Eventually the capacitor goes to a high resistance short of several ohms, which acts similarly to a heater inside the capacitor and leads to thermal runaway and to gas release due to decomposition of its polymer material and electrodes. The onset of these conditions may arise from misapplication of the capacitor, end of life of the capacitor, or premature failure of the capacitor. Failures under these conditions are usually catastrophic and result in hundreds of thousands of dollars in damage to a system and extended off-line periods for repair.

A standard capacitor using dry film technology is the wound capacitor. Wound capacitors are constructed by sandwiching a dielectric film such as polycarbonate, polypropylene, or polyester film between metal electrodes (e.g., vapor deposited metal film). Once formed, the combination dielectric/metal material is wound to form a capacitor. Some specific examples of wound capacitors are found in the following: U.S. Pat. No. 4,719,539 (Lavene), U.S. Pat. No. 4,685,026 (Lavene), and U.S. Pat. No. 5,614,111 (Lavene). Each of these U.S. patents are incorporated herein by reference.

The size of a metallized film capacitor is dictated by the thickness of its dielectric film. The thickness of the dielectric, in turn, is dictated by the required overall breakdown voltage of the capacitor. For instance, if a manufacturer cites a particular film as having a dielectric strength of 200 volts/micron and the capacitor design calls for a dielectric breakdown voltage of 400 volts, then the film may be 2 microns thick. Thus, the breakdown voltage of a capacitor depends on the dielectric strength and the thickness of the film.

When electrical current is passed through a wound film capacitor, thermal energy is generated raising the temperature of the capacitor. In large current applications (for example, 7 amperes to 30 amperes), this thermal energy can be quite large and may lead to the deterioration of the capacitor. In some applications the thermal energy may even lead to an explosion.

It is known to provide sensors to prevent capacitors from overheating or exploding. U.S. Pat. No. 7,471,498 (Laverne) and U.S. Pat. No. 7,471,499 (Bond) disclose a wound capacitor, which includes a hollow core formed by a non-conducting tubular section, and a capacitor winding wrapped around the tubular section. A sensor is disposed within the hollow core. The sensor is configured to sense a predetermined temperature level within the hollow core and provide an alert external to the capacitor winding. Each of these U.S. patents are incorporated herein by reference.

The present invention, as will be described, includes multiple wound film capacitors. These film capacitors are wound individually, one on top of another. For example, a first capacitor is wound on a hollow core. A second capacitor is wound around the first capacitor, in which the latter is used as a winding core. A third capacitor is wound around the second capacitor and so on. As will be explained, these new capacitors provide increased electrical efficiency and are operated in a cooler environment, thereby resulting in higher reliability.

SUMMARY OF THE INVENTION

To meet this and other needs, and in view of its purposes, the present invention provides multiple wound film capacitors. The capacitor includes a hollow core formed by a first non-conducting tubular section, and a first capacitor winding wrapped around the first non-conducting tubular section. A second non-conducting tubular section is wrapped around the first capacitor winding, and a second capacitor winding is wrapped around the second non-conducting tubular section.

The multiple wound film capacitors may include a third non-conducting tubular section wrapped around the second capacitor winding, and a third capacitor winding wrapped around the third non-conducting tubular section.

An end of the first non-conducting tubular section may extend beyond an end of the first capacitor winding. An end of the second non-conducting tubular section may extend beyond an end of the first capacitor winding and an end of the second capacitor winding.

The hollow core is configured to transmit energy from an interior of the hollow core to an exterior of the hollow core. The second non-conducting tubular section is configured to transmit thermal energy from the first and second capacitor windings to an exterior of the second non-conducting tubular section.

One embodiment of the multiple wound film capacitors may have first and second electrodes disposed at opposite ends of the first capacitor winding; and third and fourth electrodes disposed at opposite ends of the second capacitor winding. The second and fourth electrodes may be connected together to form two serially connected capacitors.

Another embodiment of the multiple wound film capacitors may have first and second electrodes disposed at opposite ends of the first capacitor winding; and third and fourth electrodes disposed at opposite ends of the second capacitor winding. The first and second electrodes may be connected together and the third and fourth electrodes may be connected together. The four electrodes are thus connected to form two parallel connected capacitors.

Yet another embodiment is a method of making multiple wound film capacitors. The method includes the steps of:

forming a hollow core from a first non-conducting tubular section, wrapping a first capacitor winding around the first non-conducting tubular section, wrapping a second non-conducting tubular section around the first capacitor winding, and wrapping a second capacitor winding around the second non-conducting tubular section.

The method may further include:

wrapping a third non-conducting tubular section around the second capacitor winding, and wrapping a third capacitor winding around the third non-conducting tubular section.

Still another embodiment is a wound film capacitor unit. The unit includes:

a hollow core formed by a non-conducting tubular section, a capacitor winding wrapped around the non-conducting tubular section, a thermally conductive rod inserted in the hollow core, an enclosure for receiving the capacitor winding and the conductive rod, and an end of the conductive rod includes a thermally conductive stud extending through a wall of the enclosure for mounting the enclosure onto an external thermally conductive surface. The conductive rod and the conductive stud are effective in transferring heat from the capacitor winding to the external conductive surface. The conductive stud includes a treaded end for threading the conductive stud into the external conductive surface.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

The film capacitors of the present invention are wound discretely on a small extractable core, or hollow core. They are either finished as discrete single units or assembled as a group and finished as a large unit. Concentric capacitors are wound on top of one another, using the previous capacitor as the new core. In between each active capacitor winding there is an electrically insulating barrier. This barrier varies in extension and thickness between the active capacitors. The dimension of the barrier depends on the electrical insulating criteria needed to satisfy creepage and clearance requirements.

It will be appreciated that the multiple wound capacitors of the present invention provide several advantages over conventional film capacitors. These include an ultra low equivalent series inductance (ESL), which is due to the close proximity of one capacitor to the other. Another advantage of the present invention is wound film capacitors having significant increases in current carrying capability. Since these capacitors are wound on a large hollow core which distributes the hot spot over a larger surface area, it effectively reduces the equivalent series resistance (ESR), and results in cooler multiple capacitors.

Figure 1:
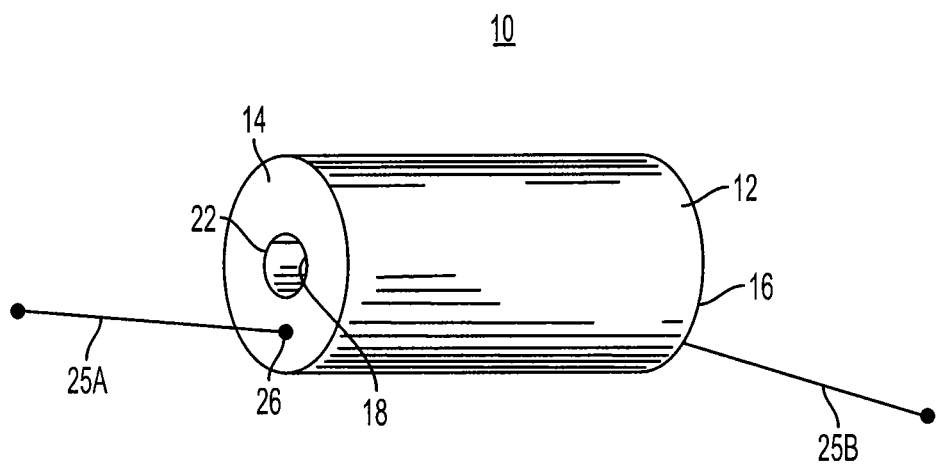
FIG. 1 is a conventional wound film capacitor with a hollow core for dissipating heat energy.

Referring first to FIG. 1, there is shown a high current carrying capacitor, generally designated as 10. Capacitor 10 includes hollow core 18 surrounded by capacitor winding 12, whereby thermal energy produced within capacitor winding 12, resulting from electrical current passing through winding 12, is transmitted to hollow core 18. As shown, hollow core 18 is formed by non-conducting tubular section 22 which extends slightly beyond the ends of capacitor winding 12 and includes thermal energy from capacitor winding 12. At opposite ends of capacitor winding 12 are two metallization layers 14 and 16.

It will be appreciated that on completion of winding 12 of the capacitor roll, the ends of capacitor winding 12 may be sprayed with a high velocity mixture of compressed air and molten fine particles of tin, or other suitable metal produced from an electric arc gun. This spray forms opposing metallization layers 14 and 16, which may be considered electrically the same as opposing first and second terminals of the capacitor. In conventional manner, wire leads 25A and 25B may then each be bonded to respective metallization layers 14 and 16, by way of solder or welded terminals 26 (one terminal only is shown). Metallization layers 14 and 16, positioned at opposite ends of the capacitor roll, completely encircle the outer circumferences of the capacitor roll.

Capacitor winding 12 is wound around tubular section 22 in conventional fashion. Hollow core 18 may be trimmed to extend approximately 0.2 to 0.3 inches beyond metallization layers 14 and 16, thereby forming core extensions, or collars. The core extensions, however, are not necessary to the present invention.

Tubular section 22 includes an inner hexagonal surface forming the hollow core. This inner surface may be used for anchoring the tubular section to a winding machine. The tubular section is then used as a mandrel for winding the film capacitor into a roll. It will be understood that although FIG. 1 shows a hexagonal cross-section forming the inner surface, any other geometric cross-section may also be used. The cross-section of the inner surface, for example, may be oval, circular, triangular, pentagonal, etc.

Tubular section 22 may be formed of a non-conductive material, such as polypropylene. Tubular section 22, as shown, forms a continuous passageway, referred to herein as hollow core 18, through its entire length. As an example, the diameter of hollow core 18 may be approximately ⅛ of an inch.

When electric current is passed through capacitor winding 12, thermal energy is generated raising the temperature of capacitor winding 12. The hottest region of capacitor winding 12 is at its geometric center. The geometric center includes the region containing tubular section 22 which is located at the radial center and the axial center of the hollow core. Thus, hollow core 18 passes directly through the region containing the highest temperature within capacitor winding 12. This region is also referred to herein as the hot spot of the capacitor winding.

The hollow core is effective in conducting thermal energy from the capacitor winding to the exterior of capacitor 10. This permits capacitor 10 to carry higher electrical current without deterioration due to excessive heat. It is believed that the geometric center of capacitor 10 does not experience a temperature rise in excess of 20° C. above ambient temperature, because hollow core 18 transfers thermal energy to the exterior of the capacitor.

Capacitor 10 with hollow core 18 may safely handle electrical current an order of magnitude higher than a similar capacitor without a hollow core, if air is circulated through hollow core 18, for example, by a fan (not shown). It is believed that if air is not circulated through hollow core 18, current capacity may still improve by a factor of 5 to 10 over a similar capacitor without hollow core 18.

Referring now to FIGS. 2A, 2B, 2C and 2D, different views of the same group of multiple wound film capacitors are shown. More specifically the figures show three wound film capacitors, in which each capacitor is wound one on top the other, in accordance with an embodiment of the present invention. As shown, multiple wound film capacitors 30 include a first capacitor winding, designated 36, a second capacitor winding designated 38, and a third capacitor winding, designated 40. The first capacitor winding 36 is wrapped around a first non-conducting tubular section, designated 32, the latter including hollow core 34.

A second non-conducting tubular section, designated as 44, is wound around the first capacitor winding 36. A third non-conducting tubular section, designated as 42, is wound around the second capacitor winding 38. Thus, the second capacitor winding 38 is wound around the second non-conducting tubular section 44, and the third capacitor winding 40 is wound around the third non-conducting tubular section 42.

Figure 2A:
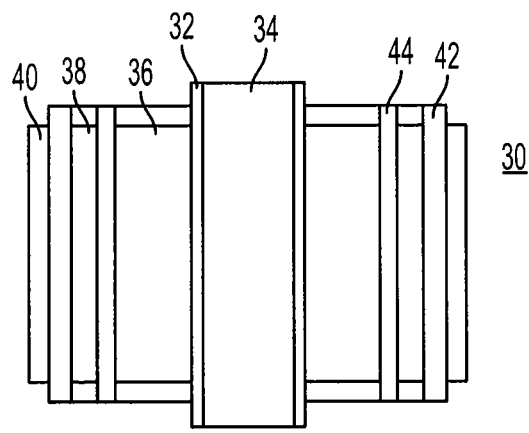
FIGS. 2A through 2D are different views of the same group of multiple wound film capacitors, specifically showing three wound film capacitors, each capacitor wound one on top of the other, in accordance with an embodiment of the present invention.
Figure 2B:
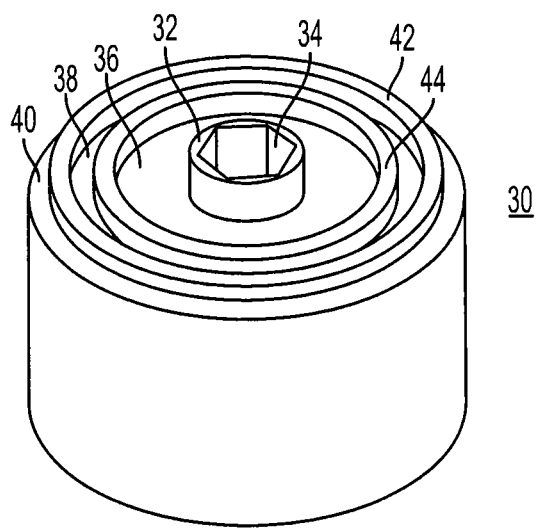
Figure 2C:
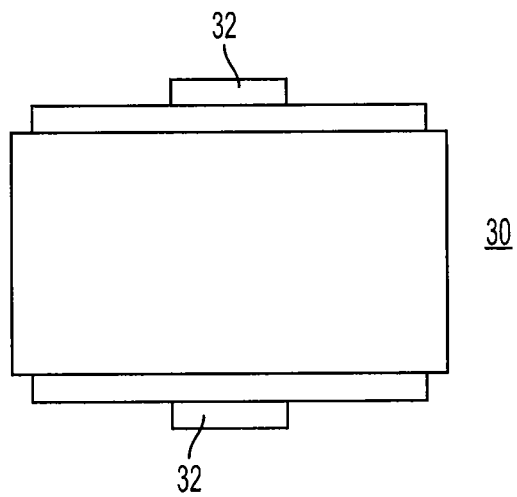

As best shown in FIG. 2B, the first non-conducting tubular section 32 extends beyond the end of the first capacitor winding 36. In a similar manner, the second non-conducting tubular section 44 and the third non-conducting tubular section 42 also extend beyond the end faces of the first, second and third capacitor windings.

It will be appreciated that the second non-conducting tubular section 44 and the third non-conducting tubular section 42 provide insulation barriers between each capacitor 36, 38 and 40. The barrier material may have a shrink rate that is the same as the film used for capacitor windings 36, 38 and 40. The thickness of each barrier layer may typically be 0.125 inches, plus or minus 0.1 inch. The thickness of each barrier layer may vary depending on the voltage applied to each capacitor. In addition, the extension of each barrier layer from the end face of a respective capacitor winding may typically be 0.125 inches, minimum.

It will be appreciated that the hollow core 34 may have a minimum diameter of 9 millimeters. The diameter may be larger, however, so long as it is compatible with the present production equipment.

The first non-conducting tubular section 32 may include material such as plastic having good electrical insulation and moisture resistive properties. The material may also include polypropylene, polyester, or polycarbonate. Other high performance materials, however, such as ceramics or thermally enhanced plastics may also be used.

Figure 2D:
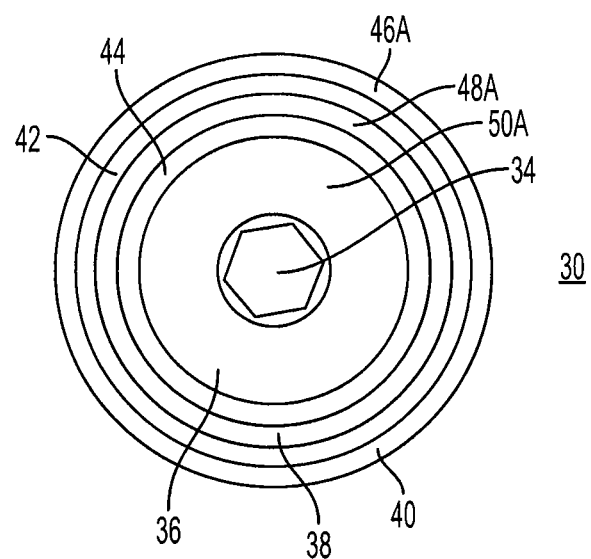

As described with respect to capacitor 10 (FIG. 1) having electrically conducting end faces 14 and 16, the multiple wound film capacitors 30 also include electrically conducting end faces, as best shown in FIGS. 2B and 2D. As shown in FIG. 2D, an electrode is attached to each end face of a respective capacitor winding. Thus, the first capacitor winding 36 includes electrode 50A, the second capacitor winding 38 includes electrode 48A, and the third capacitor winding 40 includes electrode 46A. It will be understood that the opposing ends of these capacitor windings also include electrically conducting end faces with corresponding electrodes (not shown). For example, the first capacitor winding 36 includes electrodes 50A and 50B (shown in FIG. 3D); the second capacitor winding 38 includes electrodes 48A and 48B (shown in FIG. 3D); and, lastly, the third capacitor winding 40 includes electrodes 46A and 46B (shown in FIG. 3D).

Figure 3A:
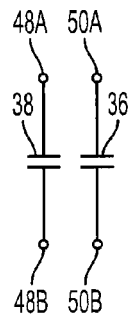
FIGS. 3A through 3G are different capacitor configurations, in which the multiple capacitors shown in FIGS. 2A-2D are connected in series or in parallel, in accordance with various embodiments of the present invention.
Figure 3B:
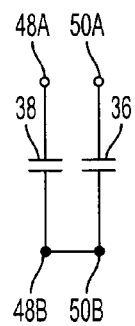
Figure 3C:
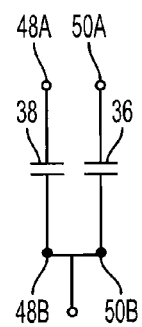
Figure 3D:
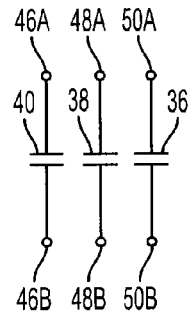
Figure 3E:
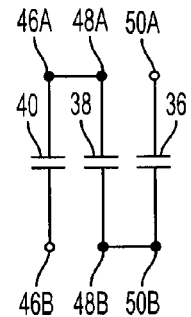
Figure 3F:
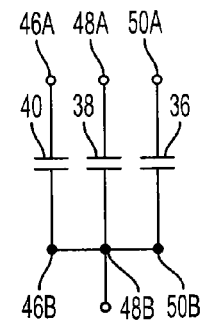
Figure 3G:
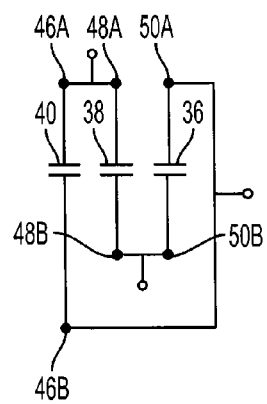

Referring now to FIGS. 3A through 3G, there are shown different capacitor configurations, in which the multiple wound capacitors 30 are connected in a series circuit, or in a parallel circuit, in accordance with various embodiments of the present invention. For example, FIGS. 3A, 3B and 3C show two capacitors 36 and 38 (similar to first and second capacitor windings 36 and 38, shown in FIG. 2). These capacitors are configured with specific electrodes for different user preferences.

FIGS. 3D through 3G show three capacitors 36, 38 and 40, that may be connected in series or in parallel, depending on a user preference. For example, the electrodes shown in FIG. 3E allow for easy series-connected capacitors 36, 38 and 40. On the other hand, the electrodes shown in FIG. 3F, allow for easy parallel-connected capacitors 36, 38 and 40. Furthermore, the electrodes shown in FIG. 3G allow the user to connect capacitor 40 either in series or in parallel with the two parallel connected capacitors 36 and 38.

Figure 4:
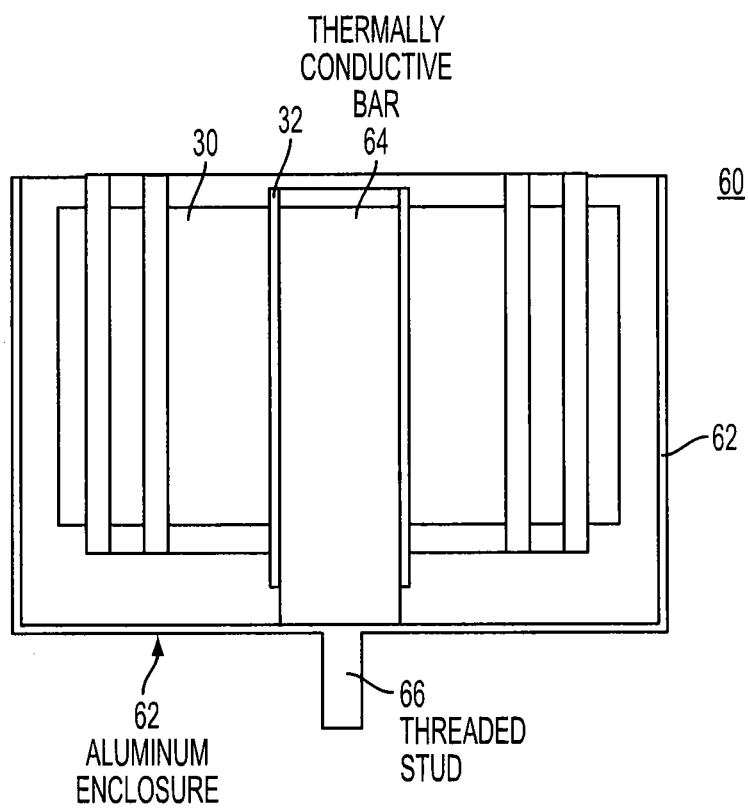
FIG. 4 is a cross-sectional view of multiple wound film capacitors, similar to the capacitors shown in FIGS. 2A and 2B, that are enclosed in an aluminum can and outfitted with a thermally conductive rod mounted to the inside of the aluminum can, in accordance with an embodiment of the present invention.

Referring next to FIG. 4, there is shown multiple wound capacitors 30 fitted into an aluminum enclosure, designated as 62. The hollow core 34, which is formed by the first non-conducting tubular section 32, is fitted with a conductive rod, or bar, designated as 64. The conductive rod may be formed from thermally conductive material, such as aluminum, ceramic, etc.

As shown, one end of conductive rod 64 includes a threaded stud, designated as 66. The threaded stud is mounted to the inside of enclosure 62, and is configured to pass through the enclosure. The threaded stud 66 is configured to be mounted on a fixture, such as a circuit board (for example), which is not shown in the figure. As enclosure 62 is mounted onto the fixture, by way of the threaded stud, heat generated from the multiple wound capacitors 30 may be transferred away from capacitors 30 and enclosure 62.

It will be appreciated that multiple capacitors 30 may be hermetically sealed inside metallic can, or enclosure 62, in which the latter may be made of thermally conductive material, such as aluminum.

The high thermal conductivity of conductive rod, or bar 64 causes thermal energy produced in the windings of multiple capacitors 30 to be conducted to the exterior of the multiple capacitors and be radiated from the end of the rod. The conductive rod 64 may extend substantially beyond enclosure 62, by way of threaded stud 66, or otherwise.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. Multiple wound film capacitors comprising:
   a hollow core formed by a first non-conducting tubular section,
   a first capacitor winding wrapped around the first non-conducting tubular section,
   a second non-conducting tubular section wrapped around the first capacitor winding, and
   a second capacitor winding wrapped around the second non-conducting tubular section.

2. The multiple wound film capacitors of claim 1 including
   a third non-conducting tubular section wrapped around the second capacitor winding, and
   a third capacitor winding wrapped around the third non-conducting tubular section.

3. The multiple wound film capacitors of claim 1 wherein an end of the first non-conducting tubular section extends beyond an end of the first capacitor winding.

4. The multiple wound film capacitors of claim 1 wherein an end of the second non-conducting tubular section extends beyond an end of the first capacitor winding and an end of the second capacitor winding.

5. The multiple wound film capacitors of claim 1 including first and second electrodes disposed at opposite ends of the first capacitor winding.

6. The multiple wound film capacitors of claim 5 including third and fourth electrodes disposed at opposite ends of the second capacitor winding.

7. The multiple wound film capacitors of claim 1 wherein the hollow core is configured to transmit energy from an interior of the hollow core to an exterior of the hollow core.

8. Multiple wound film capacitors of claim 1 wherein the second non-conducting tubular section is configured to transmit thermal energy from the first and second capacitor windings to an exterior of the second non-conducting tubular section.

9. Multiple wound film capacitors of claim 1 wherein
   first and second electrodes are disposed at opposite ends of the first capacitor winding,
   third and fourth electrodes are disposed at opposite ends of the second capacitor winding, and
   the second and fourth electrodes are connected together to form two serially connected capacitors.

10. Multiple wound film capacitors of claim 1 wherein
    first and second electrodes are disposed at opposite ends of the first capacitor winding,
    third and fourth electrodes are disposed at opposite ends of the second capacitor winding, and
    the first and second electrodes are connected together and the third and fourth electrodes are connected together, the four electrodes connected to form two parallel connected capacitors.

* * * * *